United States Patent
Salokanto et al.

(10) Patent No.: US 9,692,666 B2
(45) Date of Patent: Jun. 27, 2017

(54) CONTAINER MANAGER (71) Applicant: ROVIO ENTERTAINMENT LTD., Espoo (FI)

(72) Inventors: Heikki Salokanto, Espoo (FI); Mika Laukka, Espoo (FI)

(73) Assignee: ROVIO ENTERTAINMENT LTD., Espoo (FI)

( * ) Notice: Subject to any disclaimer, the term of this patent is extended or adjusted under 35 U.S.C. 154(b) by 245 days.

(21) Appl. No.: 14/579,062

(22) Filed: Dec. 22, 2014

(65) Prior Publication Data
US 2016/0182315 A1  Jun. 23, 2016

(51) Int. Cl.
*G06F 15/173* (2006.01)
*H04L 12/24* (2006.01)
*H04L 29/08* (2006.01)

(52) U.S. Cl.
CPC .......... *H04L 41/5054* (2013.01); *H04L 67/16* (2013.01)

(58) Field of Classification Search
CPC .......................... H04L 41/5054; H04L 67/16
USPC ......................................................... 709/226
See application file for complete search history.

(56) References Cited

U.S. PATENT DOCUMENTS

| | | | | |
|---|---|---|---|---|
| 6,138,253 A * | 10/2000 | Buzsaki | ............. | G06F 11/0709 714/47.1 |
| 8,627,152 B1 * | 1/2014 | Deb | .................... | G06F 11/0712 714/4.1 |
| 8,671,404 B2 * | 3/2014 | DeHaan | .................... | G06F 8/60 709/223 |
| 9,276,816 B1 * | 3/2016 | Conte | ................. | H04L 41/0893 |
| 2007/0043860 A1 * | 2/2007 | Pabari | .................... | G06F 9/5072 709/224 |
| 2009/0144579 A1 * | 6/2009 | Swanson | ............. | G06F 11/0712 714/3 |
| 2009/0300210 A1 | 12/2009 | Ferris | | |
| 2010/0049851 A1 | 2/2010 | Garrison et al. | | |
| 2011/0295999 A1 | 12/2011 | Ferris et al. | | |
| 2013/0290468 A1 * | 10/2013 | Ramakrishnan | ...... | G06F 9/4856 709/213 |
| 2013/0290661 A1 * | 10/2013 | Reuther | ................ | G06F 3/0647 711/162 |

(Continued)

OTHER PUBLICATIONS

Francese Lordan et al., "ServiceSs: An Interoperable Programming Framework for the Cloud", Sep. 20, 2013, 25 pages.

*Primary Examiner* — Vivek Srivastava
*Assistant Examiner* — Atta Khan
(74) *Attorney, Agent, or Firm* — Squire Patton Boggs (US) LLP (57) ABSTRACT

The present invention relates to a method for managing containers in a could computing environment, the method comprising obtaining current information on resources available at hosts, obtaining information on host resources needed for a new container and allocating the new container to a selected host based on the resources available at the host and the host resources needed for the container. The present invention further relates to an apparatus and a computer program product implementing the method for managing containers. The method and the apparatus beneficially speeds up the process of allocating and replacing containers and ensures that only the latest version of the applications placed in containers are available in the cloud computing environment for client devices.

12 Claims, 6 Drawing Sheets

(56) References Cited

U.S. PATENT DOCUMENTS

| | | | | |
|---|---|---|---|---|
| 2014/0052867 A1* | 2/2014 | Lucovsky | ........... | H04L 63/0245 709/226 |
| 2014/0149591 A1* | 5/2014 | Bhattacharya | ...... | H04L 67/1097 709/226 |
| 2016/0162320 A1* | 6/2016 | Singh | .................... | G06F 9/5055 718/1 |

* cited by examiner

CONTAINER MANAGER

FIELD OF THE INVENTION

The present invention relates to computer virtualization and especially to method for managing containers as defined in the preamble of independent claim 1. The present invention further relates to an apparatus for managing containers as defined in the preamble of independent claim 11.

BACKGROUND OF THE INVENTION

Virtual servers (a.k.a. virtual machines) were one of the early steps used for computer virtualization. Logically, a virtual server appears like a separate computer, having its own IP address. The virtual server includes not only the application and the necessary binary application software and libraries to run the application, but an entire guest operating system. This kind of virtual server is resource heavy and rather slow to set up. It also requires a separate license for the operating system for each virtual server, which typically increases cost.

Use of containers is a more recently introduced method of virtualization of computers or, more specifically, computer software applications. A container separate the application from the operating system and the physical infrastructure it uses to connect to the computing network. The container is instantiated within the kernel of the operating system, and it virtualizes the instance of an application. The container doesn't include the operating system like a virtual machine does. Use of containers enable running multiple applications using same host computer resources, without the applications interfering each other. Typically, the container doesn't have an externally available IP address of its own, although it has a unique ID that may be used by the host. Therefore, a client cannot access the container directly. Rather, the server/host manages the container, and the container manages the application code.

An example of such container is Linux Containers LXC. LXC leverages container groups (cgroups) to isolate the CPU, memory, file/block IO and network resources. Namespaces are used to isolate application from the operating system, so that network access, process trees, user IDs and file access are separated.

Orchestration platform provides to developers and system administrators a tool for building and shipping distributed applications, and it may provide an application programming interface (API) to the programmers and developers for provisioning of container groups.

Containers may be placed on a host using a container deployment tool, which is a service run on virtual host(s). Orchestration platform communicates with the container deployment tool via a standardized interface using a protocol. For example, HTTP protocol may be used over a defined application programming interface (API) in a REST architecture. Such interface is also often called as a RESTful API. Also data format(s) to be used in the standardized interface shall be agreed. An example of a data format useful in such interface is JavaScript object notation JSON, but any suitable existing or future data format may equally be selected.

When a container is placed on a host, it's given an address and subnet that is unique within the host. Container interface is a virtual Ethernet bridge that automatically forwards packets between any other network interfaces that are attached to it, so that containers may communicate with the host machine and with each other.

While using containers, users can build any application in any computer language, using any software development tools. With use of a container system, the application becomes portable, and can run anywhere, with any operating system, such as, in example, Windows, Ubuntu or Red Hat.

BRIEF DESCRIPTION OF THE INVENTION

The object of the present invention is to provide a method and apparatus for managing containers. The objects of the present invention are achieved with a method according to claim 1. The objects of the present invention are further achieved with an apparatus according to claim 11, and with a non-transitory computer readable medium having stored thereon a set of computer readable instructions according to claim 10.

The preferred embodiments of the invention are disclosed in the dependent claims.

According to a first aspect, method for managing containers is provided, the method comprising obtaining information on host resources needed for a new container, obtaining current information on resources available at hosts and allocating the new container to a host based on the resources available at the host and the host resources needed for the container.

According to a second aspect, the method further comprises: obtaining a number of parameters indicating the resources needed for the new container and obtaining current information on resources available at hosts from an orchestration platform, wherein said parameters and said information on resources available comprise at least one of: processing power, amount of non-volatile memory, amount of volatile memory, IO capacity, IO type, level of availability and special conditions for high availability.

According to a third aspect, allocating the new container comprises uploading or managing the uploading of the application to a host, providing instructions to the host to create the new container and providing instructions to the host to start the new container.

According to a fourth aspect, the method further comprises maintaining information on container IDs of containers allocated to the hosts.

According to a fifth aspect, the method further comprises locating an old container with a previous version of a program held by the new container, wherein the old container is identified by its container ID, storing said container ID, providing instructions for redirecting client traffic towards the new container and providing instructions for removing the old container after the new container with a new version of the program has been allocated and after client traffic has been rerouted to the new container, the instructions identifying the old container to be removed by said container ID.

According to a sixth aspect, the method further comprises at least one of a) if any of the parameters and/or special conditions cannot be met, not allocating the new container to a host, detecting an error and returning an error message indicating that no suitable host is available and b) if creation of the new container fails, not allocating the new container to a host, detecting an error and returning an error message indicating that the creation of the new container has failed and c) if allocation of the new container fails, detecting an error and returning an error message indicating that the allocation has failed and d) if redirecting of routing of client traffic towards the new container fails, returning an error message indicating that the redirecting has failed.

According to a seventh aspect, if an error is detected during creation or allocation of the new container, the method further comprises providing instructions to destroy the new container that caused the error, providing instructions to create another new container to replace the new container that caused the error and repeating the allocating with said another new container.

According to an eighth aspect, the method further comprises providing information on container IP addresses and ports to a load balancing function.

According to a ninth aspect, any or all of said obtaining, allocating, maintaining, recognizing, storing, providing instructions or providing information are run autonomously by a container manager functionality.

According to a tenth aspect, non-transitory computer-readable medium having stored thereon a set of computer readable instructions is provided that, when executed by at least one processor, cause an apparatus to at least: obtain current information on resources available at hosts, obtain information on host resources needed for a new container, and allocate the new container to a host based on the resources available at the host and the host resources needed for the container.

According to an eleventh aspect, an apparatus for managing containers is provided, said apparatus comprising: first obtaining means for obtaining information on host resources needed for a new container; second obtaining means for obtaining current information on resources available at hosts; and allocating means for allocating the new container to a host based on the resources available at the host and the host resources needed for the container.

According to a twelfth aspect, an apparatus for managing containers is provided wherein: said first obtaining means are arranged for obtaining a number of parameters indicating the resources needed for the new container; and wherein said second obtaining means are arranged for obtaining current information on resources available at hosts from an orchestration platform;
and wherein said parameters and said information on resources available comprise at least one of: processing power, amount of non-volatile memory, amount of volatile memory, IO capacity, IO type, level of availability and special conditions for high availability.

According to a thirteenth aspect, an apparatus for managing containers is provided, said apparatus further comprising means for maintaining information on container IDs of containers allocated to the hosts.

According to a fourteenth aspect, an apparatus for managing containers is provided, said apparatus further comprising: locating means for locating an old container with a previous version of a program held by the new container, wherein the old container is identified by its container ID, storing means for storing said container ID, first instructing means for providing instructions for redirecting client traffic towards the new container; and second instructing means for providing instructions for removing the old container after the new container with a new version of the program has been allocated and after client traffic has been rerouted to the new container, the instructions identifying the old container to be removed by said container ID.

According to a fifteenth aspect, an apparatus for managing containers is provided, said apparatus further comprising at least one of: first detecting means for detecting an error and means for returning an error message indicating that no suitable host is available, if any of the parameters and/or special conditions cannot be met, not allocating the new container to a host; and second detecting means for detecting an error and means for returning an error message indicating that the creation of the new container has failed if creation of the new container fails, not allocating the new container to a host; and third detecting means for detecting an error and means for returning an error message indicating that the allocation has failed, if allocation of the new container fails; and fourth detecting means for returning an error message indicating that the redirecting has failed, if redirecting of routing of client traffic towards the new container fails.

According to a sixteenth aspect, an apparatus for managing containers is provided, said apparatus further comprising: third instructing means for providing instructions via a container command interface to destroy the new container that caused an error, if an error is detected during creation or allocation of the new container; and fourth instructing means for providing instructions to create another new container to replace the new container that caused the error.

According to a seventeenth aspect, any or all of the means for obtaining, allocating, maintaining, recognizing, storing, providing instructions or providing information run autonomously within a container manager functionality.

According to an eighteenth aspect, a non-transitory computer readable medium having stored thereon a set of computer readable instructions is provided that, when executed by at least one processor, cause an apparatus to perform the method according to any of the first to ninth aspect.

The present invention is based on the further improvement of use of containers with an orchestration platform, by improving the management of containers. A container manager is introduced, which collects and maintains up-to-date information on containers currently residing at the hosts in the cloud computing environment. While the information on the available host computers and the amount and kind of resources available on each of them is also made easily available to the container manager by the orchestration platform, use of the container manager and the novel features it introduces optimize and enhance the process of allocating new containers.

Introducing the container manager within or in collaboration with the orchestration platform has the advantage that host computer resources can be deployed better, taking into account the level of actual use of the resources. Further, time required for software deployment can be decreased with use of the container manager, as the container manager automatically seeks and allocates the container to the most suitable host. The container manager also ensures that no legacy software, i.e. old versions of application software, is running in the production environment, but only the latest version. The solution using container manager is platform independent so that it can be utilized even in a production environment comprising different platforms.

BRIEF DESCRIPTION OF THE FIGURES

In the following the invention will be described in greater detail, in connection with preferred embodiments, with reference to the attached drawings, in which.

DETAILED DESCRIPTION OF THE INVENTION

The following embodiments are exemplary only. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a system architecture in which various embodiments of the invention may be implemented. Only elements relevant for illustrating the embodiments are described. Various implementations of the information system comprise elements that are suitable for the example embodiments and may not be specifically described herein.

As used herein, the terms "virtual server", "server", "node" and "host" refer to a physical or virtual computational entity capable of enhancing information and to perform computational tasks. The term server or host may refer to one entity or a group on entities configured to operate jointly.

As used herein, term "programming environment" refer to any kind of environment that a programmer uses for creating code and/or building executable program packages.

"Orchestration platform" is a management platform for allocating the applications to the host(s) and instantiating new hosts. A host can be a physical, a virtual, or a partitioned host, such as a container. When containers are used, the orchestration platform builds containers from the readily built application software when requested, creates an identity to the container and provides the container or application to the host. Orchestration platform also handles cases where containers are not used, i.e. even when an application requires an entire server computer for its individual use. Orchestration platform collects status information of the host network, i.e. a computing cloud, and may update the status information by sending requests to the host network.

"Configuration service" is a service, API and/or user interface that provides the programmer with the tools for providing requests and instructions towards the orchestration platform, and for placing requirements and parameters to be used for any container that is being built in the orchestration platform.

"Production environment" refer to any computing environment where the application software is available for users in the final executable form. This may be a single computer, a computer network or a computing could. The computer may comprise one or more virtual servers and the computer network or computing cloud may comprise one or more physical servers and/or one or more virtual servers.

"Development environment" refer to a computing environment where the application software is available for limited set of users, in example test users, in the final executable form. This may be a single computer, a computer network or a computing could. The computer may comprise one or more virtual servers and the computer network or the computing cloud may comprise one or more physical servers and/or one or more virtual servers.

Term "cloud computing environment" is used as a common name for a computing environment that may be either a production environment or a development environment or both at the same time.

The orchestration platform and/or the configuration service, although logically described being entities locating between the development environment and a production environment, may also reside within the production environment. In example, the orchestration platform and/or the configuration service may be implemented as a Java software and it may use in example Windows of Linux OS. The orchestration platform and/or the configuration service may themselves be located in a cloud computing environment, even in the same cloud of hosts where the containers it manages reside. Alternatively, these functionalities may reside on one or more physical servers, and they may also comprise containers.

Figure 1:
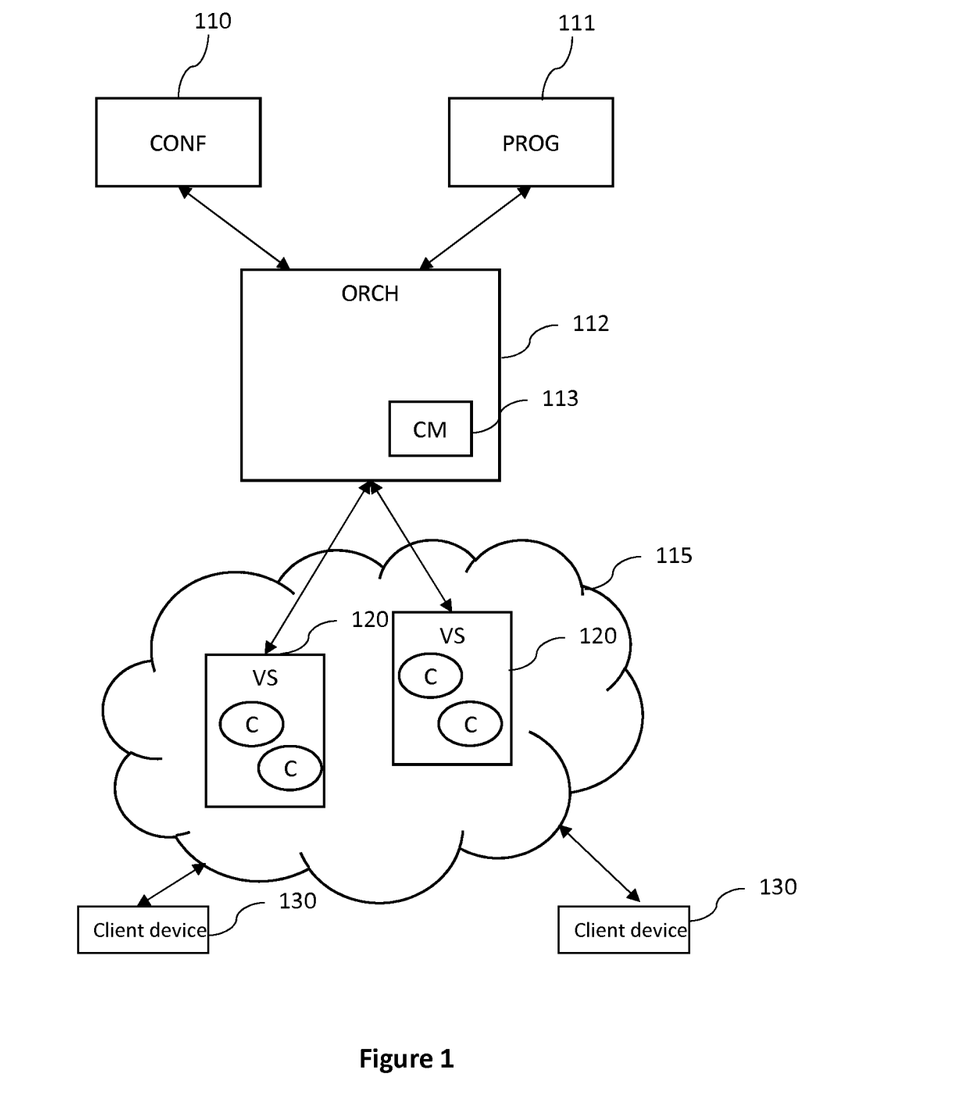
FIG. 1 shows a schematic presentation of a computing system.

The FIG. 1 shows a schematic presentation of a computing system. Software developers use programming environment 111 for editing, compiling and building software. When a new software is built, it will be provided to the orchestration platform 112 through an interface for further processing and placing it into the cloud computing environment 115, in other words into a computer network where the program can be run and accessed by client devices 130. Orchestration platform 112 instantiates a container for the received software package. While production environment or test environment are similar in many aspects, or may actually reside within same computing cloud, the cloud computing environment 115 may present either. If we specifically refer to either use in the description, that will be apparent based on the term we use. Configuration service 110 provides tools for the programmer make requests to the orchestration platform 112 and to provide the requirements and preferences for the new or updated software build that is to be placed in the cloud computing environment 115, so that the orchestration platform 112 and the container manager 113 have sufficient information for further processing the software. Architecturally the container manager 113 may be part of the orchestration platform 112. Benefits of this are i.e. that the two share same data about the containers and the network, and no special interfaces need to be defined between the two.

Communication between programming environment 111 and orchestration platform 112, and between configuration service 110 and orchestration platform 112 may happen over a suitable application programming interface API, for example Representational State Transfer (REST) API or Simple Object Access Protocol (SOAP) API, using data format supported by the API, such as Extensible Markup Language (XML) or JavaScript Object Notation (JSON). Through the API communication link, the programmer may upload new version of software in binary form from the programming environment 111 to the orchestration platform 112 for creation of a container C. Similarly, the configuration service 110 communicates with the orchestration platform 112, and may provide in example various instructions and parameters towards the orchestration platform 112.

The cloud computing environment 115 contains one or more hosts 120. These hosts 120 are physical or virtual servers that provide the actual physical platform in the cloud computing environment 115 where the containers C, each comprising an executable computer program, are stored in physical memory/memories and run in processors, and may be accessed by the client devices 130. These containers C may comprise same or different applications and/or services, for instance. We'll mainly use the short term "application"

in this document, but it should be understood that this term generally means executable application software, which provides a service. Sometimes, terms service and application may be used interchangeably.

Orchestration platform 112 may collect information on resources and load situation of the hosts 120. This may happen through sending requests towards the hosts 120 over an API, such as Representational State Transfer (REST) API or Simple Object Access Protocol (SOAP) API, or through a remote execution mechanism, for example Secure Shell SSH. This information is made available to the container manager 113 for making decisions on allocations of the containers C. Container manager 113 may obtain information about resources available and load situation of the hosts 120 through a shared data structure, such as a synchronized map or a database table. Information may be obtained through reading a memory location within the shared data structure or making a query towards the shared data structure and receiving response to such query. The information may be received in connection with an incoming request or a message related to an incoming request.

Container manager 113, forming a part of orchestration platform 112 architecture, keeps track on containers C allocated to the hosts 120 utilizing container IDs. Container ID is a unique random character string generated at the instantiation of a container. The container manager 113 collects and keeps information on container IDs and knows the host 120 where each container C resides. This information about container IDs enables the container manager 113 to facilitate deletion of containers C. A request for deleting a container C may be provided to the container manager 113 through configuration service 110 interface, or deletion request may be triggered in the container manager 113 when a request for placing a new container C with an updated build of an application is received, replacing the old container C having an earlier version of the application. The container manager 113 places a new container C in the cloud computing environment 115 before removing the container C with an old instance of the application in a controlled manner. Thus, the container manager 113 ensures that i) there is always a working version of the application available for clients in the cloud computing environment 115 and ii) only the most recent version of an application is available in the host network for the clients (such as client devices 130) to use, and thus it also ensures that no legacy code is executed in cloud computing environment 115. The process of replacing containers C will be further described in connection to FIG. 5.

Container manager 113 may use several parameters for making decisions on how containers C are allocated to the hosts 120. Container manager may obtain the parameters related to requirements for a new container C to be allocated in various ways without departing from the scope. For example, the parameters may be received in a request coming in from the programming environment 111 or from the configuration platform 110 of from any authorized platform. Alternatively, said parameters may be specifically requested by the container manager 113 for example from the configuration platform 110 or any other authorized platform, when the container manager 113 has received a task for allocating a new container C. In a yet further alternative, the container manager 113 may read the parameters from a register, a data table or a memory location. Decisions made by the container manager 113 on allocation may be based purely on required or available resources. Non-limiting examples of such resource related parameters are type and performance of processor (i.e. CPU) at the host, amount of volatile memory available, amount of non-volatile memory, such as disc space, IO (input and output) type, for example fault-tolerant storage or distributed storage, and IO capacity availability and requirements. In addition, further special parameters or requests may be provided, in example that the container C requires special handling, i.e. that it may not share the host 120 with any other container C. Parameters may have some priority order, and some or all parameters may be considered as mandatory, whereas other may be considered instructions which are filled with best effort. Some or all parameters may have preset default values, so that if a specific request lacks information on a specific parameter value, the default value may be used instead for managing the container C. Container manager 113 may also take into account high availability preferences. As an example, a container C may be placed to a less crowded/loaded host 120 even if there was enough resources on another but more loaded host 120 in order to facilitate high availability of the service provided by the application. High availability may be achieved by distributing the containers C to different hosts 120 rather than filling the hosts 120 with containers C one by one. High availability as such is a concept known by a man skilled in the art, and detailed implementation for achieving the level of availability is omitted here. High availability may also be parameterized, and the request for configuration may contain a parameter or any kind of special request indicating whether high availability is of importance to a specific container C. Also capacity and/or quality of network IO may be handled as a parameter or as a special request, when IO is of special importance to the program in the container C. A special request may even comprise that no containers C shall be used for a specific application, but that a real or virtual server is required in its entirety, and no sharing of resources is allowed.

Container manager 113 may optimize the use of resources depending on the intended use of the applications. In development environment it may be more important to utilize the available host resources as well as possible, and the actual resource usage load per individual application may be low, thus allowing placing more containers C in a single host 120 without affecting the functionality or significantly reducing the experienced performance. In such situation, the container manager 113 may even omit some parameters from management decision making. In actual production environment, where application may be used by a huge amount of clients, it's more important to ensure sufficient resources for each container C also during peak hours. Then high availability may be the key parameter for allocating the containers C, and failure to meet any single parameter may cause the container manager 113 to deny creating the new container C, but return an error indication. The error indication may be returned to the programming environment 111 or towards the configuration service. Whichever route is used, the error message provides indication to the programmer that some special action may be needed before the container C can successfully be created and placed in the production environment.

Container manager 113 may manage lifecycle of containers C. When a software is updated, and a new version of the built software is uploaded to orchestration platform 112 in order to place it to a container C and upload to a host 120, container manager 113 recognizes the old container C located at any host 120 with the old version of the application by the container ID, and instructs deletion of that container C from the host 120. This way the container manager 113 ensures that only the most recent version of each program resides in the host network and is available for clients (i.e. client devices 130) to use.

Container manager 113 also handles error situations in determining the most suitable host 120. In example, there may be no suitable host 120 available with sufficient resources for a new container C, there may be some software error that is found during the allocation process or a configuration error may have occurred. Then the container manager 113 may provide an error indication back to the developer through the configuration service 110 interface or through the programming environment 111. Some error situations may be temporary, and container manager 113 may handle these independently, or it may first try to handle these independently. In example, it may destroy the new but erroneous container created earlier and create a new one for the same application instance to replace the destroyed container. Term "destroy" is used for removal of a new container C, which is still not employed in the cloud computing network 115 in order to distinguish this task from removal of an existing container C which from a host 120, which has been available for use within the cloud computing network 115. If independent error correction is used, the error may be reported only if the correction procedure doesn't fix the problem.

The container manager 113 is an autonomous entity. With autonomous we mean that the container manager 113 works continuously according to any given settings and instructions, without need for human intervention. The executable container manager program code runs continuously within the container manager node. Using term continuously here means that when in normal operation, the container manager 113 is constantly available for container management tasks, but it doesn't require that the container manager 113 should always perform some tasks specific to the container management process, but it may occasionally be in some kind of waiting state or mode while waiting for new tasks.

Figure 2:
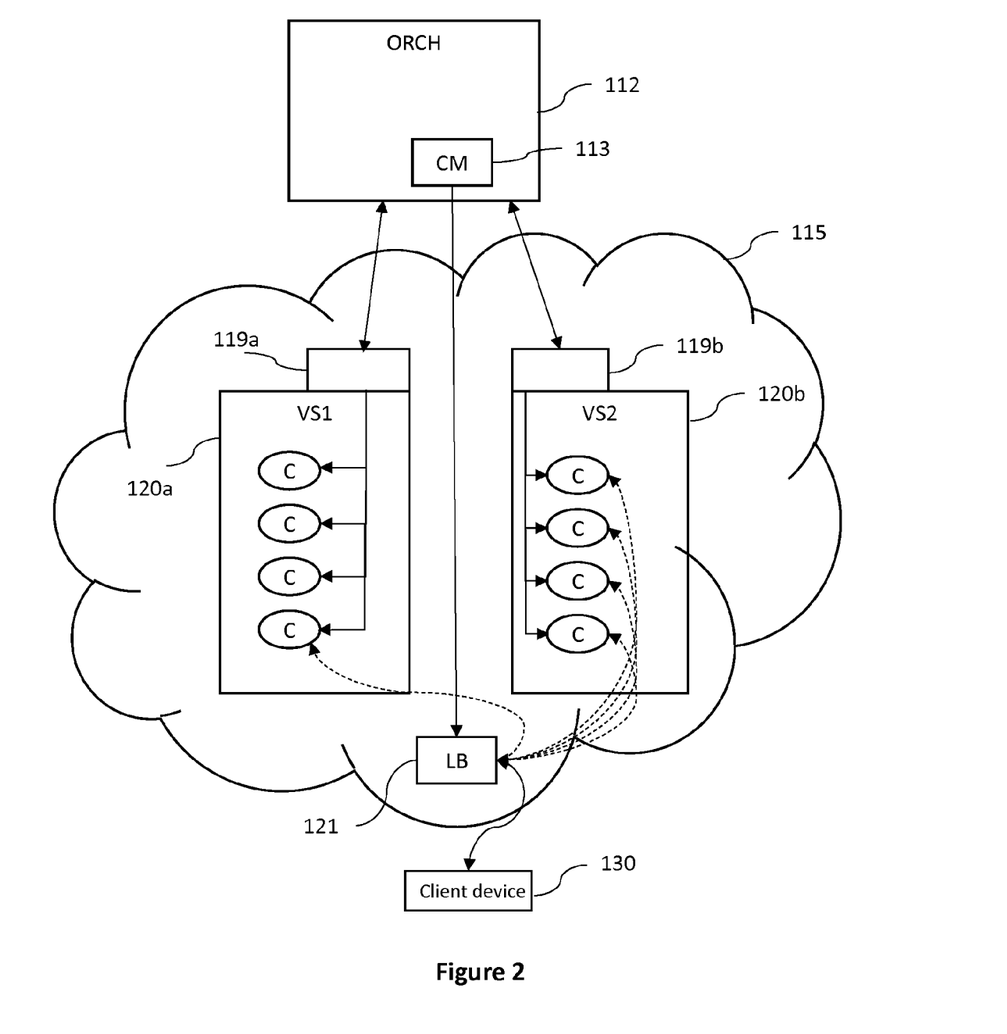
FIG. 2 presents a schematic view of further functionalities managed or coordinated by the container manager.

FIG. 2 presents a schematic view of further functionalities managed or coordinated by the container manager 113.

When allocated to a host 120, containers C do not have their own IP address. Within the host 120, the containers C have their unique port, and the host manages the containers it holds. The host 120 may be a physical server or a virtual server, in example. In FIG. 2, we can see two exemplary hosts 120 containing several containers C. These containers C may comprise different programs, or they may comprise copies of the same program, so that load caused by multiple client devices 130 using same service or application may be balanced by allocating users to different containers C providing same service. A container command interface 119 is responsible for managing the containers C placed in the host 120. The hosts 120a and 120b both comprise a container command interface 119a, 119b respectively. Let's use host 120a for explaining the functionality of the container command interface 119a. When a new container C is allocated to the host 120a, the orchestration platform 112 contacts the host 120a that has been identified by the container manager 113. The new container C is sent to the host 120a via the container command interface 119a, which defines the port to be used for the container C within the host 120a. The container C is stored to the host 120a, and can be accessed by contacting the host 120a IP address and the specific port of the container C. Further container management activities, such as deletion, stopping, restarting, suspending or reconfiguring of the container C, are handled at the host 120a through the container command interface 119.

When several containers C exist for same service, a load balancer 121 may be used to manage sharing of the computing load caused by numerous client devices 130 using the same service, so that each client device 130 may experience sufficient availability of the requested service. Container manager 113 communicates with the load balancer 121 in order to refresh its routing configuration, so that the load balancer 121 always has up-to-date information of which host(s) 120 and port(s) are running a container C of any requested service. The host(s) and port(s) of the containers C do not need to be revealed to the client device 130; instead, the load balancer 121 may map a single public address onto several container addresses. The traffic from client devices 130 may be balanced to the containers C for example in a round-robin manner, in which all containers C get an equal share of the traffic, or dynamically depending on which host 120 is experiencing the least load at a given moment.

Figure 3:
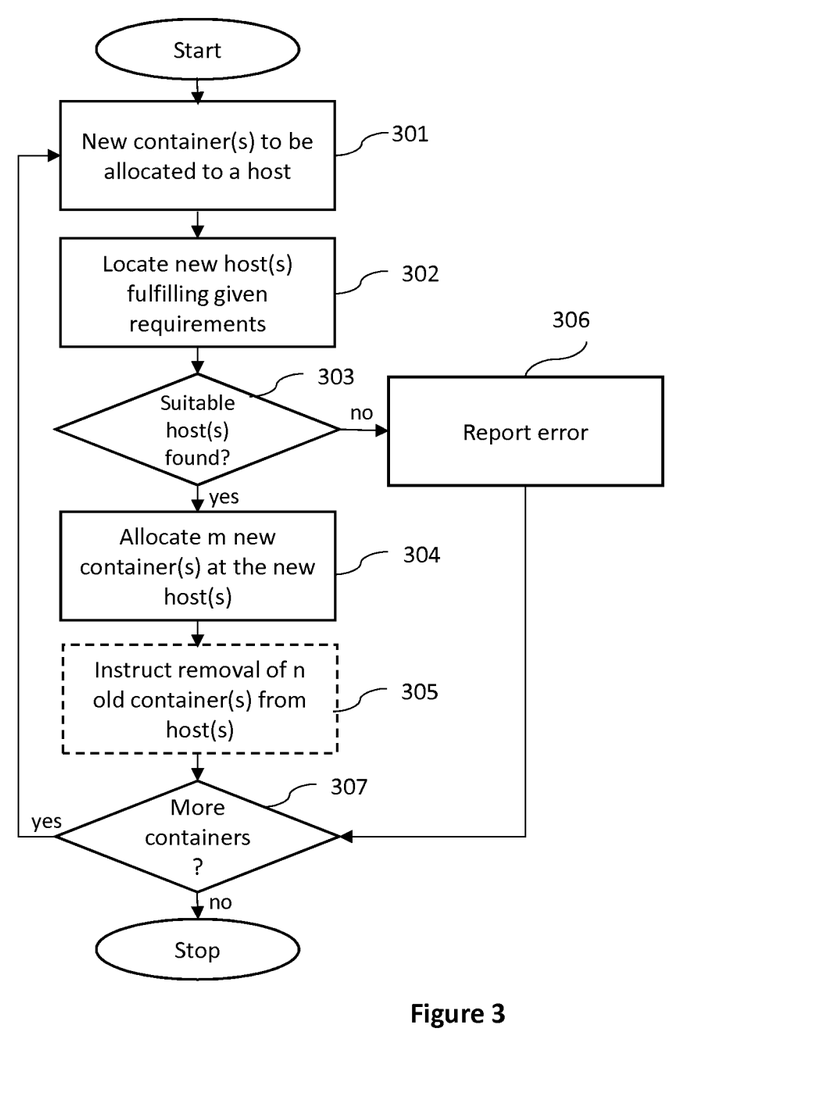
FIG. 3 describes a process for allocating new containers to a host.

FIG. 3 describes an embodiment of a process for allocating new containers to a host.

In phase 301 the container manager obtains information that new container(s) is/are ready to be allocated to at least one host in the production environment or to the development environment. The obtaining in this phase 301 may comprise receiving at least one message or request from the programming environment, from the configuration platform or from any other authorized platform. The obtaining may alternatively comprise reading a register or a flag indicating to the container manager that there's need to retrieve information from a storage media, or to make a request for information relating to the new container(s) to be allocated. After obtaining the information on the new container(s) to be allocated, the container manager has sufficient knowledge about the new container(s) to be allocated and the parameters and special requests set to the(se) container(s), so that the container manager may continue to the next phases of the process. The information obtained in this phase comprises the parameters and possible special requirements set to the new container(s). The process described in this example may handle one container at a time, or a group of containers in a batch, thus the singular and plural forms are used in the description of this embodiment. Batch processing may indicate parallel processing, or serial processing where a number of containers are handled in a row, one after another, or any combination of these two. The container manager makes decisions on whether to allocate the containers in groups or individually one by one. In phase 302 the container manager obtains information about the resources currently available at different hosts, and also the current load situation at different hosts, and uses the information it has obtained, as well as information about the current containers in each host to make a decision on allocation of the new container(s). The container manager may obtain the current information about hosts by accessing a shared data structure, such as a synchronized map or a database table. Information may be obtained through reading a memory location within the shared data structure or making a query towards the shared data structure and receiving response to such query. If the shared data structure would not have the requested information for any reason, the information may be a by sending queries towards the hosts. In case no suitable hosts are found in phase 303 fulfilling the requirements set to each container, the container manager may report an error situation in phase 306. If suitable hosts were found in phase 303, the container manager allocates the new containers in phase 304, the allocation comprising uploading or managing the uploading of the service(s) to the new host(s) and providing instructions to create and start the container(s) at the selected new host(s) via the container command interface of the host(s). With new host we mean the host allocated to the new container.

In one embodiment, the phase of allocation comprises submitting at least one request to the new host over a RESTful API. Said one or more requests comprise parameters indicating which service will be placed in the container. If all phases are completed successfully, the new container is created and started. In a further embodiment, two requests may be sent to the host, one for creating a container and another for starting the container. The host may have a pre-created generic image that is used as a template for creating all new containers. This generic image does not comprise service code identifying the application to be placed in the container. The service code will only be stored in the container when it's created or started.

In yet another alternative embodiment, an image repository may be utilized, so that an image is created for each application every time the application is updated. The container is created and started in a similar manner as in the earlier alternative, but the request provided to the new host over the RESTful API comprises additionally a parameter indicating which image is used for creating the container. The image repository comprises several images, one for each different application, and each image has a service code, identifying the application to be placed in this container type. This alternative requires having an additional network element in the computer network, namely the image repository.

Figure 5:
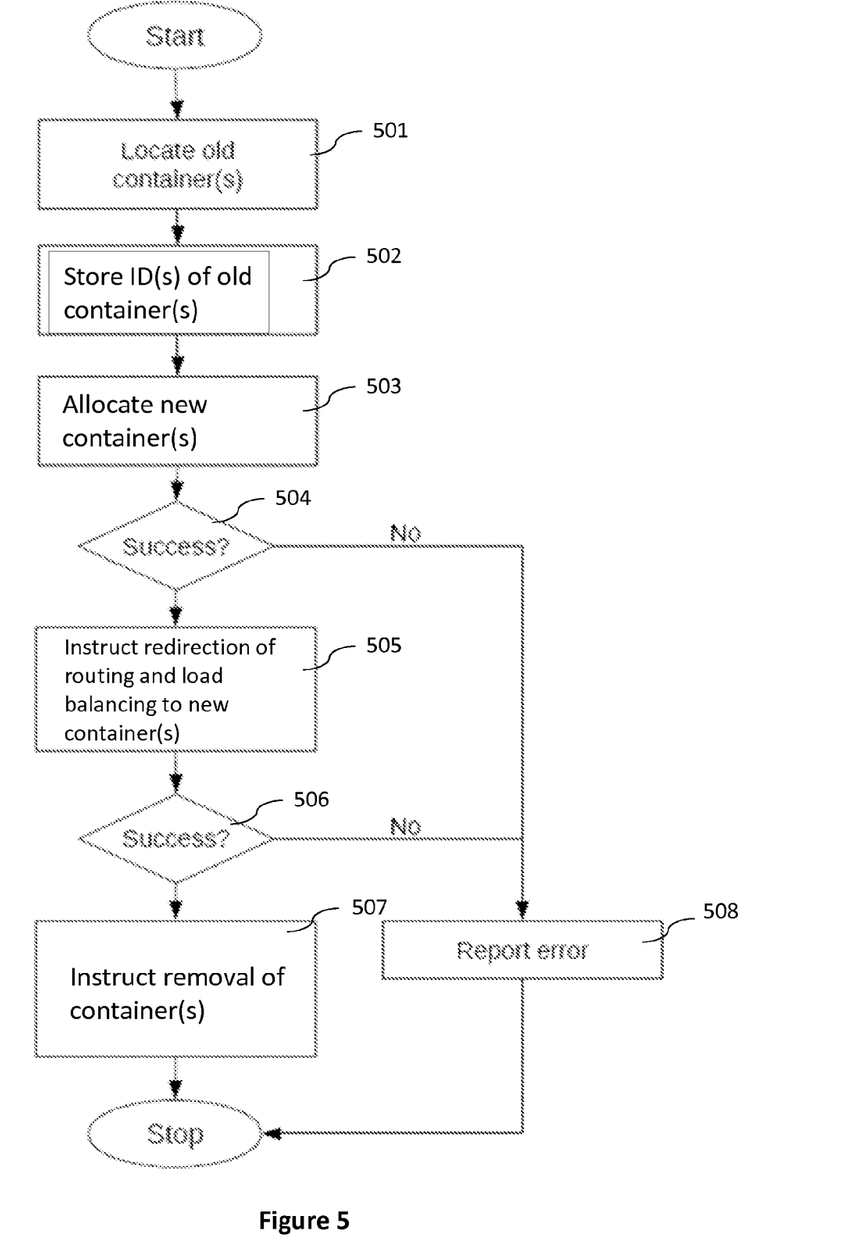
FIG. 5 presents an exemplary embodiment for replacing old container(s).

The number of new containers to be allocated is marked with m, which can be any integer equal to or greater to 1, and may be, but doesn't need to be equal to n. In case the container manager has recognized old instance(s) of the same software existing in the network, it instructs removal of the old container(s) from host(s) in phase 305 after the new containers have been taken into use. This phase has is optional in the sense that in case the program is new and thus no old versions of the program exist in the cloud computing environment, this phase may naturally be omitted. This is highlighted with dashed line in box describing this phase 305. FIG. 5 presents an exemplary embodiment for replacing old container(s). The process of FIG. 5 could be used instead of the simplified phases 304 and 305. One or more old containers may be instructed to be removed in batch. Batch removal may indicate serial or parallel processing at the host(s) and the instructions to remove the old containers may be sent to one or more host(s), i.e. to the container command interface of the one or more host(s), in a single instruction message or in multiple instructions messages which may be sent simultaneously or one after another. A group of old containers may be removed in batch even if the instructions would be sent towards the container command interface of the host(s) one at a time. This feature is reflected with n, which is number of old containers to be removed. N may be any integer equal to or greater than 0. The old containers may naturally reside at any host in the network, and in case multiple containers are removed, they may be on the same or on different hosts. After the m containers have been allocated to new host(s) and the possible old containers for same application have been removed, or after an error in allocation of the containers has been reported, the process continues to phase 307 for checking whether there are further containers to be allocated, and if so, the process is started again for the further container(s). All container operations are managed by the container manager, and the orchestration platform provides the container manager the needed support, such as making up-to-date lists of hosts and their resources available.

Implementation of some services may require multiple applications to be run in parallel or simultaneously, or in collaboration with each other. When the service is updated, several containers may need to be replaced with new ones. Alternatively, high availability may set a requirement that several instances of same application, i.e. several containers containing the same application, may be needed in the production environment. When several containers are to be removed and allocated, container manager makes decisions on the order of removing the old containers and allocating the new containers. In example, if 10 new containers are needed for replacing 10 old containers, the container manager may choose to give instructions to replace all 10 containers at once. Alternatively, it can be more convenient to replace a subset of the containers at a time, in example allocating 2 new containers and then removing 2 containers, then allocating 2 further new containers and removing 2 further containers and so on. The order may be optimized depending in example on the service requirements, availability of services, application characteristics or system load.

Figure 4:
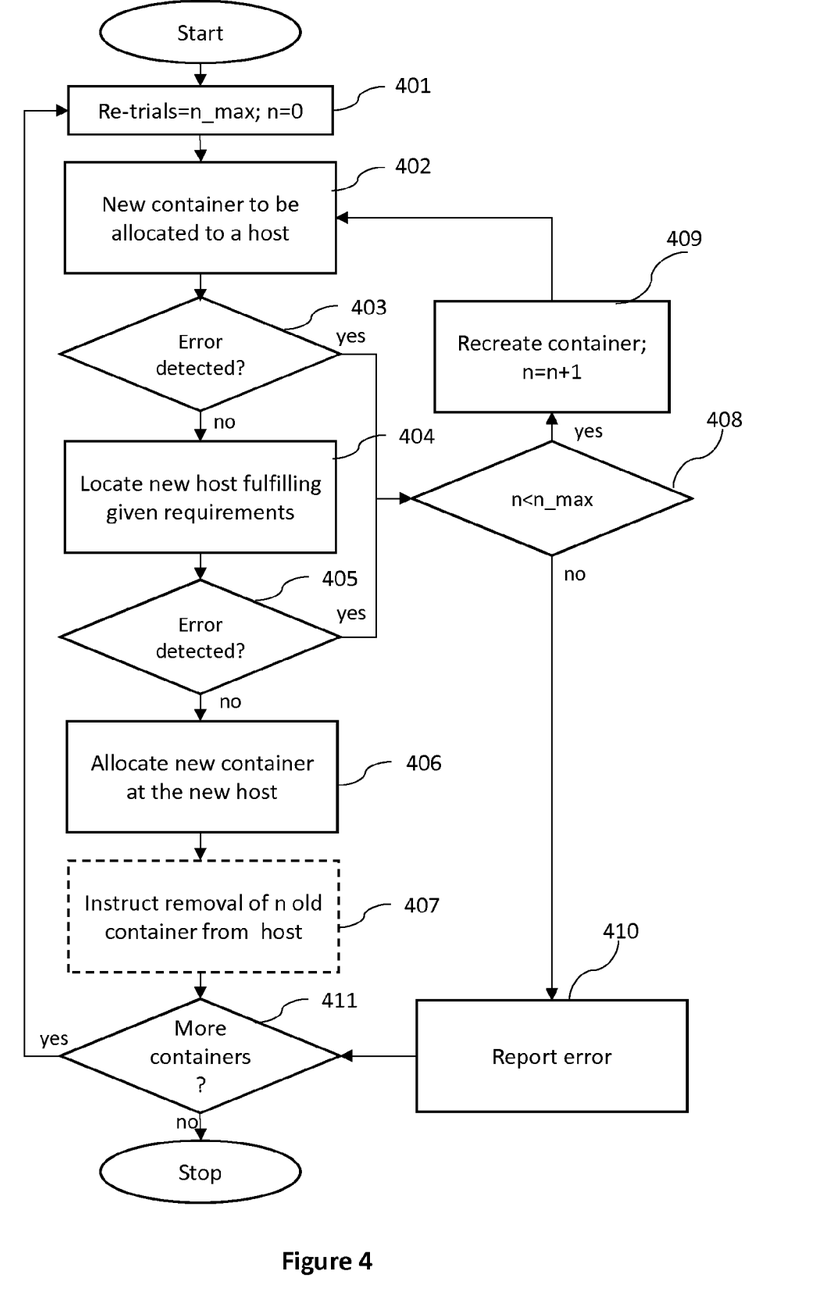
FIG. 4 describes a process for allocating new container to a host with error correction.

FIG. 4 describes functionality of the container manager when an error is detected in allocating a new container. In this example, we just have a single new container to be allocated for simplicity, but the process may be easily amended to handle multiple containers in a batch as described above in connection to FIG. 3, in example.

The exemplary process starts from setting a maximum value n_max for autonomous re-trials instructed by the container manager, and setting counter n for counting number of re-trials to zero in phase 401. N_max may be any integer greater than or equal to one. A request to allocate a new container may be received in phase 402. As in the corresponding phase in relation to FIG. 3, this phase comprises also obtaining information about parameters and special requirements set for the new container. The request may be received from various different sources. The request may come through the configuration service, but it may also be received from the orchestration platform, or some other authorized platform. The request may be provided as an automated task from any of the mentioned authorized platforms, or it may be initiated manually by an administration user. The container manager may detect some error in the container or in the request at this phase, and it may try an automatic correction by requesting recreation of the container. If an error situation have been detected in relation to the container in phase 403, or if a new host cannot be found for some reason, the container manager takes notice of an error situation, and checks whether it's expected to make a new trial for allocating the container. If the number of re-trials is less than the set maximum n_max (checked in phase 408), the container manager increases the re-trial calculator n by one, instructs removal of the error-causing newly created container and requests creation of a new one in phase 409. Now the allocation process is restarted at phase 402 for the new container. If no error is detected in phase 403, the process continues similarly as in previous example: in phase 404 the container manager obtains information in relation to the hosts in the cloud computing environment and the resources available at these host in a similar manner as explained in relation to phase 302 of FIG. 3, and then compares the requirements given for the new container and the resources available at the hosts to locate a new host. Again, an error may be detected at phase 405 and container manager may proceed to the error correction loop through phases 408 and 409 similarly as above. In some occasions, the recreation of the container may fix the problem. This kind of automatic error correction loop is fast, it can be run in seconds, and thus the whole allocation process speed is improved in comparison to a manual error correction process. After the error-checks in phases 403 and 405 have been successfully passed, the originally submitted or the re-created container may be allocated to the host in phase 406. As in the previous example in relation to FIG. 3, in the phase of allocation, the container manager uploads or manages the uploading of the application to the host, instructs via the container command interface of the host to create and start the container. Next, the optional phase 407 for instructing removal of the old container holding the same application is performed similarly as explained in the previous example. Again, the simplified phases 406 and 407 may be replaced with a more detailed process, such as the one described in FIG. 5. If the attempted re-creation/correction of a previously failed container creation is not successful, after trying to correct an error situation with a container for n_max times without success, the container manager detects in step 408 that maximum number of retrials has been reached and returns an error in phase 410. Then it's likely that there is some problems with the program or the container or the configuration request that needs attention from the programmer and/or an administration user. After handling of a container is finished either by successfully allocating it to a host or by reporting an error that occurred during the allocation process, process will check in phase 411 whether there are further containers to be allocated, and if there are more containers, the process will start again.

FIG. 5 describes an embodiment for implementing container replacement process. The aim of the replacement process is to ensure that the service provided by the application in the container(s) is always available for clients, and that clients are rerouted towards the new container(s) in orderly manner. Also the load balancing functionality shall be rerouted towards the new container(s) duly. This embodiment may be used to replace the more simplified phases 304 and 305 of FIG. 3 or phases 406 and 407 of FIG. 4. The exemplary replacement process begins by locating the old container or container(s) in phase 501, depending on whether one or more old container(s) are to be replaced. This may be based on the list of containers maintained by the container manager, in which list the containers are identified by their container ID's. If the list of containers would for any reason be lost, i.e. because the container manager was restarted, the list of containers may be reconstructed by querying the container command interface on all hosts. The number of old container(s) to be removed and the number of new container(s) to be created may be different from each other. Also, the new containers do not need to be allocated to the same hosts and the old containers. After locating the old container(s) to be removed, the container manager stores the ID(s) of the old container(s) in step 502 that may be subject to removal later in the process. Next, an attempt to allocate the new container(s) is made in phase 503. Allocation of new container(s) comprises uploading or managing the uploading the application to the host(s) and creation of the container(s) at the hosts: the container manager chooses host(s) for the new container(s) and instructs the chosen host(s) via the respective container command interface(s) to create the container(s). If the container allocation is found successful in checking phase 504, the process continues to phase 505, instructing of redirection of routing and load balancing to the new container(s) now comprising the latest version of the application software. This way the client traffic will start using the newest version of the application when it's available, and while all clients start using the newest version, the container(s) with the old version of the application will not be used any more. Container manager provides the load balancing node(s) information about hosts and ports of each available container, so that the load balancing nodes may forward the client traffic towards the containers. The client devices don't see the host and port information, but see and use only a normal IP address to access the application. By instructing removal the information of the old containers from the routing data used by the load balancing node(s), the container manager causes stopping use of the old containers, and the load balancing node(s) will route all client traffic towards the new containers. If the rerouting process is completed successfully so that no further client traffic is routed towards the old container(s), which is checked in phase 506, the old container(s) whose ID(s) were stored in phase 502 will be removed in phase 507 by the container deployment tool at the host(s) based on the instructions provided by the container manager. While the old container(s) are not in use by any clients any more, the removal can be made in a controlled manner, without risk of causing disturbance to any ongoing client traffic communication. In the case that either of the checking phases 504 or 506 indicate error, an error report is given in phase 508 and the replacement process is stopped. This ensures that in case the creation instruction phase 503 or redirection instruction phase 505 or failure of container creation or traffic redirection following these instructions would cause problems in the new container(s), which problems could cause malfunction of the service provided by the application for clients, the replacement process is aborted and the replacement is cancelled until the problem has been fixed. If some new containers have already been created in the process before an error is detected, these may either be removed, or the already created containers may be left running in the cloud computing environment so that the cause of the error could be more easily resolved.

Figure 6:
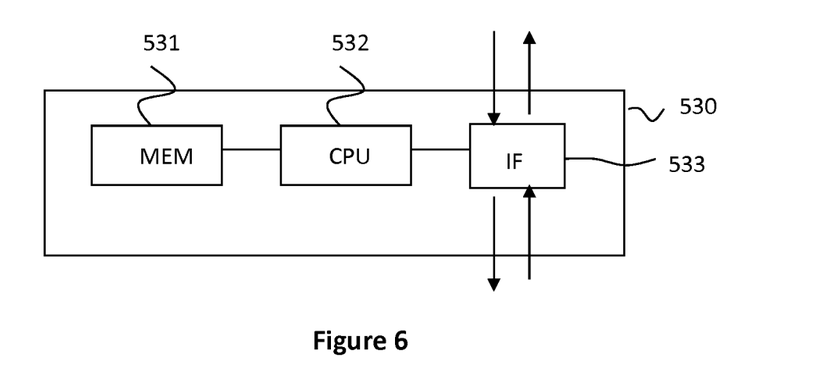
FIG. 6 illustrates an example of a node device.

FIG. 6 illustrates an example of a node suitable to act as a container manager device. As described earlier a node refers to a physical or virtual computational entity capable of managing virtual nodes associated with it. The computational entity may be a device capable of handling data. It may be a server device, computer or like running a container manager application. The node device 630 comprises a memory (MEM) 631, for storing information relating e.g. to the virtual nodes associated with it, instructions how to handle messages etc. The memory 631 may comprise volatile or non-volatile memory, for example EEPROM, ROM, PROM, RAM, DRAM, SRAM, firmware, programmable logic, etc.

The node device 630 further comprises one or more processor units (CPU) 632, for processing the instructions and running computer programs and an interface unit (IF) 633, for sending and receiving messages and data.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for managing containers in a cloud computing environment, wherein the containers are instantiated within a kernel of an operating system and are virtualizations of a computer software application, the method comprising:

obtaining, by a server, a number of parameters indicating host resources needed for a new container;
obtaining, by the server, current information on resources available at hosts from an orchestration platform;
allocating, by the server, the new container to a host based on the resources available at the host and the host resources needed for the container;
locating, by the server, an old container with a previous version of a program held by the new container, wherein the old container is identified by its container ID;
storing, by the server, said container ID;
providing, by the server, instructions for redirecting client traffic towards the new container; and
providing, by the server, instructions for removing the old container after the new container with a new version of the program has been allocated and after client traffic has been rerouted to the new container, the instructions identifying the old container to be removed by said container ID,
wherein said parameters comprise at least one of processing power, amount of non-volatile memory, amount of volatile memory, IO capacity, IO type, level of availability, or special conditions for high availability, and wherein:
if any of the parameters and/or special conditions cannot be met, not allocating the new container to a host, detecting an error and returning an error message indicating that no suitable host is available;
if creation of the new container fails, not allocating the new container to a host, detecting an error and returning an error message indicating that the creation of the new container has failed:
if allocation of the new container fails, detecting an error and returning an error message indicating that the allocation has failed; and
if redirecting of routing of client traffic towards the new container fails, returning an error message indicating that the redirecting has failed.

2. A method for managing containers according to claim 1, wherein said allocating the new container comprises:
uploading or managing the uploading of the application to a host
providing instructions to the host to create the new container; and
providing instructions to the host to start the new container.

3. A method for managing containers according to claim 1, the method further comprising:
maintaining information on container IDs of containers allocated to the hosts.

4. A method for managing containers according to claim 1, wherein if an error is detected during creation or allocation of the new container,
providing instructions to destroy the new container that caused the error;
providing instructions to create another new container to replace the new container that caused the error; and
repeating the allocating with said another new container.

5. A method for managing containers according to claim 1, the method further comprising:
providing information on container IP addresses and ports to a load balancing function.

6. A method for managing containers according to claim 1, wherein
any or all of said obtaining and allocating are run autonomously by a container manager functionality.

7. A non-transitory computer-readable medium having stored thereon a set of computer readable instructions that, when executed by at least one processor, cause an apparatus to at least:
obtain current information on resources available at hosts from an orchestration platform;
obtain a number of parameters indicating host resources needed for a new container, wherein containers are instantiated within a kernel of an operating system;
allocate the new container to a host based on the resources available at the host and the host resources needed for the container;
locate an old container with a previous version of a program held by the new container, wherein the old container is identified by its container ID;
store said container ID;
provide instructions for redirecting client traffic towards the new container; and
provide instructions for removing the old container after the new container with a new version of the program has been allocated and after client traffic has been rerouted to the new container, the instructions identifying the old container to be removed by said container ID,
wherein said parameters comprise at least one of processing power, amount of non-volatile memory, amount of volatile memory, IO capacity, IO type, level of availability, or special conditions for high availability, and wherein:
if any of the parameters and/or special conditions cannot be met, not allocating the new container to a host, detecting an error and returning an error message indicating that no suitable host is available;
if creation of the new container fails, not allocating the new container to a host, detecting an error and returning an error message indicating that the creation of the new container has failed:
if allocation of the new container fails, detecting an error and returning an error message indicating that the allocation has failed; and
if redirecting of routing of client traffic towards the new container fails, returning an error message indicating that the redirecting has failed.

8. An apparatus for managing containers in a cloud computing environment, wherein the containers are instantiated within a kernel of an operating system and are virtualizations of a computer software application, the apparatus comprising:
at least one memory comprising computer program code;
at least one processor;
wherein the at least one memory and the computer program code are configured, with the at least one processor, to cause the apparatus at least to:
obtaining a number of parameters indicating host resources needed for a new container;
obtain current information on resources available at hosts from an orchestration platform;
allocate the new container to a host based on the resources available at the host and the host resources needed for the container;
locate an old container with a previous version of a program held by the new container, wherein the old container is identified by its container ID;
store said container ID;
provide instructions for redirecting client traffic towards the new container; and provide instructions for removing the old container after the new container with a new version of the program has been allocated and after client traffic has been rerouted to the new container, the instructions identifying the old container to be removed by said container ID, wherein said parameters comprise at least one of processing power, amount of non-volatile memory, amount of volatile memory, IO capacity, IO type, level of availability, or special conditions for high availability, and wherein:

if any of the parameters and/or special conditions cannot be met, not allocating the new container to a host, detecting an error and returning an error message indicating that no suitable host is available;

if creation of the new container fails, not allocating the new container to a host, detecting an error and returning an error message indicating that the creation of the new container has failed:

if allocation of the new container fails, detecting an error and returning an error message indicating that the allocation has failed; and if redirecting of routing of client traffic towards the new container fails, returning an error message indicating that the redirecting has failed.

9. An apparatus for managing containers according to claim 8, wherein the at least one memory and the computer program code are further configured, with the at least one processor, to cause the apparatus at least to:

maintain information on container IDs of containers allocated to the hosts.

10. An apparatus for managing containers according to claim 8, wherein the at least one memory and the computer program code are further configured, with the at least one processor, to cause the apparatus at least to:

provide instructions via a container command interface to destroy the new container that caused an error, if an error is detected during creation or allocation of the new container; and provide instructions to create another new container to replace the new container that caused the error.

11. An apparatus for managing containers according to claim 8, wherein the obtaining and allocating run autonomously within a container manager functionality.

12. A non-transitory computer readable medium having stored thereon a set of computer readable instructions that, when executed by at least one processor, cause an apparatus to perform the method according to claim 1.

\* \* \* \* \*